Jan. 13, 1959 K. W. MOSELEY 2,868,516
HOMOGENIZER
Filed March 5, 1956 3 Sheets-Sheet 2

INVENTOR.
Karl W. Moseley
BY Quarles & French
Attys

Jan. 13, 1959  K. W. MOSELEY  2,868,516
HOMOGENIZER
Filed March 5, 1956  3 Sheets-Sheet 3

INVENTOR.
Karl W. Moseley
BY
Quarles & French
Att'ys ns Patent Office 2,868,516
Patented Jan. 13, 1959

2,868,516

HOMOGENIZER

Karl W. Moseley, Milwaukee, Wis., assignor to W. M. Sprinkman Corporation, Milwaukee, Wis., a corporation of Wisconsin Application March 5, 1956, Serial No. 569,484

4 Claims. (Cl. 259—4)

The invention relates to homogenizers.

The object of the invention is to provide an homogenizer to efficiently mix and blend together the ingredients of chemical compositions, after burner fuel compositions of jet oil and water, food compositions, such as salad dressings, and other compositions. According to the invention, a series of nozzles of variable cross-sectional areas are provided and preferably arranged to provide impact surfaces between each set of nozzles.

A further object of the invention is to provide an homogenizer that may be made from stainless steel or other non-corrosive material that may be readily cleaned.

A further object of the invention is to provide an adjustable distributor at the outlet of the homogenizer to film out the treated material and permit adding one of the ingredients such as the oil to other ingredients forming the film.

The invention further consists in the several features hereinafter described and more particularly defined by claims at the conclusion hereof.

Figure 1:
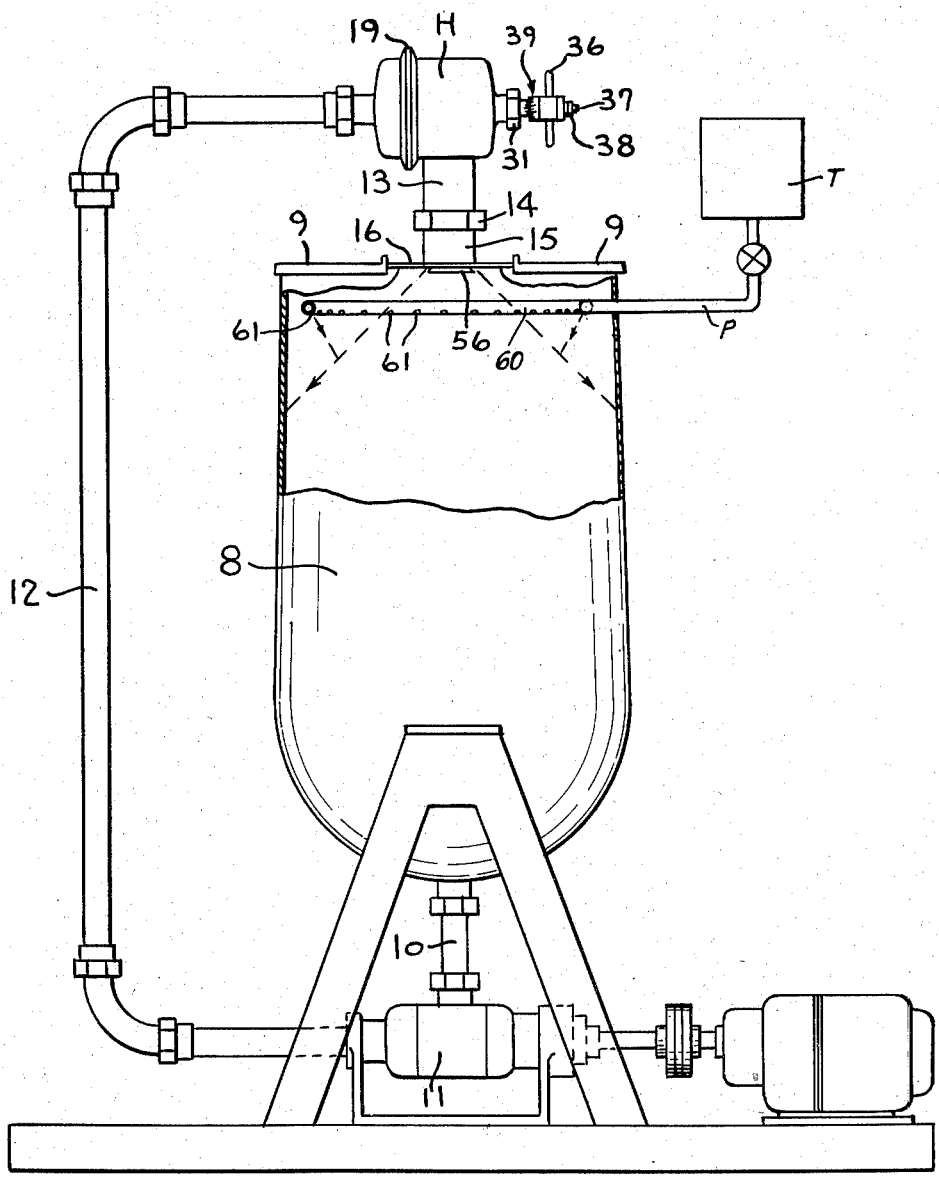
Fig. 1 is a side elevation view of an homogenizer embodying the invention with associated apparatus, parts being broken away and parts being shown in section.
Figure 2:
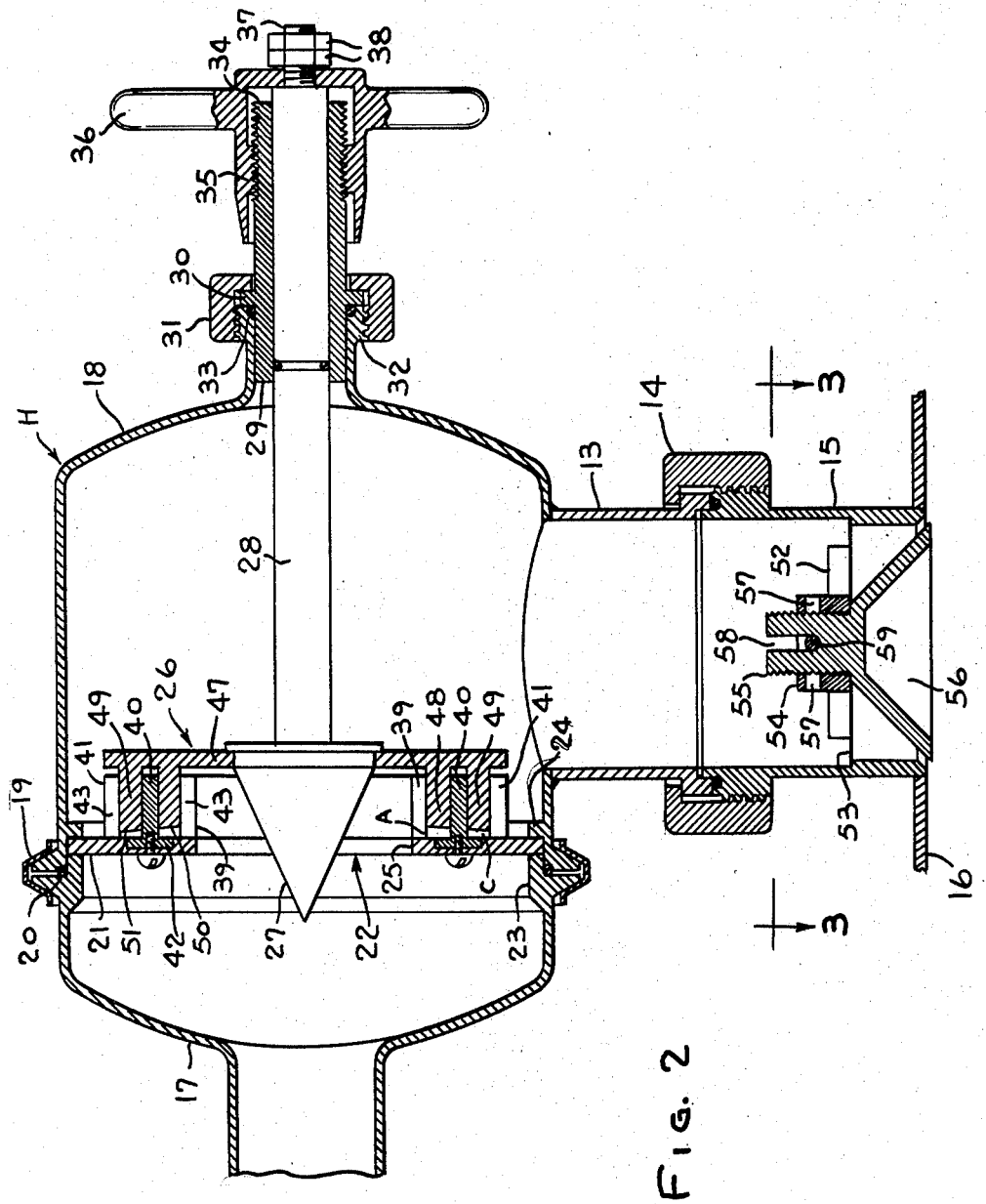
Fig. 2 is a detailed vertical sectional view through apparatus embodying the invention.
Figure 4:
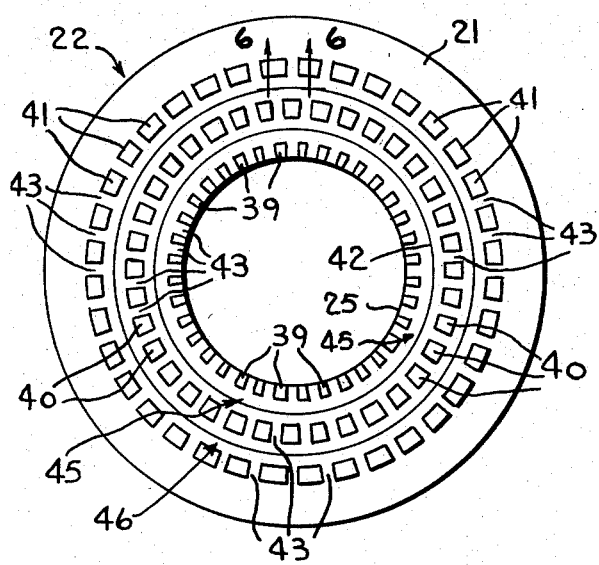
Fig. 4 is a front elevation view of the fixed nozzle and impactor portion of the homogenizer.

Referring to Figs. 1 and 2, the numeral 8 designates a tank having removable top cover sections 9 and an outlet 10 connected to the inlet of a rotary pump 11 whose outlet is connected by piping 12 to the inlet of the homogenizer H whose outlet 13 has a union joint connection 14 with a discharge tube 15 mounted on a plate 16 suitably supported, preferably independently of the tank 8.

Referring to Fig. 2, the homogenizer H has a two part housing formed by tubular parts 17 and 18 having flanged ends joined together by a suitable clamping ring 19 and sealed by a rubber ring 20. The plate base 21 of one of the homogenizer elements 22 is simultaneously clamped to parts of the housing when said parts are secured together, its peripheral portion being secured between opposing shoulders 23 and 24 formed on the parts 17 and 18. The base has a central opening 25.

The other homogenizer element 26 is carried on the conically headed end 27 of a shaft 28 that is lengthwise slidably movable in a sleeve 29 that has a flanged portion 30 clamped by an annular nut 31 to a threaded tubular end 32 of the part 18, this joint being sealed by a rubber ring 33.

The outer end 34 of the sleeve 29 is threaded to engage the threaded portion 35 of a hand wheel or nut 36 which at its central portion is rotatably mounted on the threaded stud end 37 of the shaft 28 which carries stop nuts 38. A vernier scale 39 indicated in Fig. 1 is provided between the sleeve 29 and the nut 36. With this arrangement turning of the hand wheel or nut 36 causes inward or outward translation of the shaft 28 and element 26 relative to the sleeve 29 and its associated housing.

Figure 6:
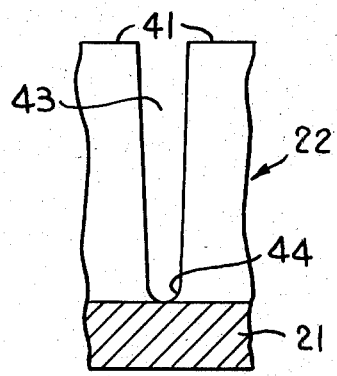
Fig. 6 is a detailed vertical sectional view taken on the line 6—6 of Fig. 4.
Figure 5:
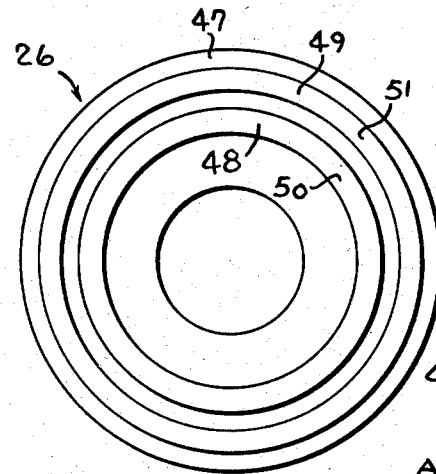
Fig. 5 is a front elevation view of the movable nozzle portion of the homogenizer.
Figure 3:
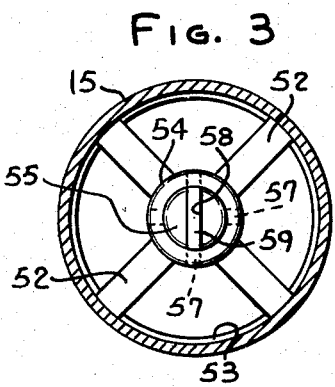
Fig. 3 is a detailed vertical sectional view taken on the line 3—3 of Fig. 2.

The homogenizer element 22 has the flat base ring portion 21 and plural sets of a series of circumferentially spaced radially disposed projections 39, 40, and 41. Where this element is machined, the projections 40 are formed on an annular member 42 inset and secured to the portion 21 as indicated in Fig. 2, but where this element is formed by casting, it may be in one piece. Each of the projections 39, 40, and 41 are separated from each other by slots 43, one of which is shown in Fig. 6. Each slot 43 extends down to the surface of the plate 41 and preferably tapers outwardly and upwardly from its curved bottom 44. Annular spaces 45 and 46 are formed respectively between the projections 39 and 40 and 40 and 41. The sets of projections 40 are staggered or offset relative to the sets of projections 39 and 41 so that a projection 40 faces a slot between adjacent projections 39 and a projection 41 faces a slot between adjacent projections 40 to provide impact surfaces.

Figure 7:
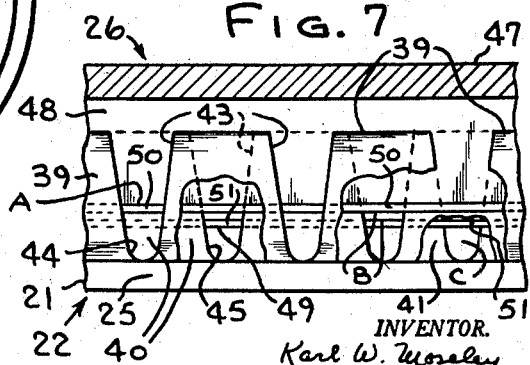
Fig. 7 is a developed and schematic view of parts of the homogenizer to illustrate the progressive action thereof.

The homogenizer element 26 has a flat base plate portion 47 with radially spaced annular projections 48 and 49 projecting therefrom and adapted to work in the spaces 45 and 46 and slidably interfit the projections at the sides of these spaces. The front faces 50 and 51 of the projections 48 and 49 are preferably formed on a slant or inclined or tapered inwardly from the outer edge of face 51 to the inner edge of face 50. These faces cooperate with the slots in the element 22 to form plural sets of nozzles or orifice openings, the first orifice A being formed by the slots between the projections 39 and the lower end of the projection 48, the orifice B being formed between the projections 40 and the opposite side of the lower end of projection 48 and also between said projections and the inner side of the lower end of projection 49 while the orifice C is formed between the outer side of the lower end of projection 49 and the projections 41. This will be more readily apparent from an inspection of Fig. 7 which shows a development of the orifices. Since the surfaces of the annular parts 48 and 49 are inclined as above described, the orifices A will be larger than the orifices B and the orifices B larger than the orifices C so that the sizes of the orifices progressively decreases. The actual sizes of these orifices are determined by the lengthwise adjustment of the shaft 28 and element 26 relative to the bases of the slots formed between the projections 34, 40, and 41.

With this arrangement the material in the tank 8 is withdrawn by the pump 11 and forced through the pipe 12 into the housing of the homogenizer and is diverted by the conical head 27 and the central portion of the element 26 toward the projections 39 and the annular part 48 and is then forced through the orifices A, B, and C above described. After passing through the orifice A, the material impinges against the inner faces of the projections 40 and is then diverted into the orifices B from which it passes and impinges against the inner faces of the projections 41 and is then diverted to the orifices C and discharged therefrom to the outlet 13 and tube 15 and returned to the tank. The orifices A, B, and C have a shearing action on the material being treated while the impingement of the material, particularly where it has an oily constituent, acts to break up the oil globules. An extremely fine division of particles is the result, in the case of oil, the apparatus will reduce the size of the globules to between four and five microns.

Where it is desirable to first premix some of the ingredients and then add the oil or other ingredient to this premix, I prefer to spread out the material received from the homogenizer before it passes to the tank and add the oil or other ingredient to this spread out stream of material as indicated in Fig. 1. For this purpose a spider 52 rests on an internal shoulder 53 of tube 15 and has an internally threaded hub 54 in which the threaded shank 55 of a conical deflector 56 is mounted. By screwing the shank 55 inwardly or outwardly of the hub 54 the spacing of the lower edge of the deflector 56 relative to the bottom end of the tube 15 may be varied. The hub 54 has diametrically located sets of holes 57 and the shank 55 a diametrically disposed slot 58 so that for any quarter turn adjustment position a locking pin 59 may be inserted in one set of holes 57 and through the slot 58 to hold the parts against relative rotation. For adding the oil ingredient to the mix I have shown an annular distributor tube 60 adapted to be connected with a suitable source of supply (as by a valve controlled pipe P connected with a supply tank T) and provided with one or more openings 61 for directing or allowing the oil to flow down onto a portion of the film of other ingredients flowing down from the deflector 56. After the initial addition of the oil to the other ingredients, this mixture is circulated by the pump through the homogenizer to thoroughly blend and mix the oil with the other ingredients, one of which usually is an emulsifier for the oil.

I desire it to be understood that this invention is not to be limited to any particular form or arrangement of parts except in so far as such limitations are included in the claims.

What I claim as my invention is:

1. In an homogenizer, the combination of a housing, a pair of members mounted in said housing for lengthwise adjustment relative to each other and constructed and arranged to provide a series of sets of adjustably variable radially disposed circumferentially spaced homogenizing orifices, the areas of the sets of orifices varying with the radial disposition thereof, the orifices spaced at a less radial distance from the center of the housing being larger than those at a greater radial distance, and means distinct from said members for forcing the material being treated through said orifices.

2. In an homogenizer, the combination of a housing, a member mounted in said housing having a central opening and spaced sets of annularly disposed slots, a second member having an annular obturating portion disposed in the space between said spaced sets of slots and adjustable lengthwise relative to the inner ends of said slots to form orifices, the orifice forming part of the annular portion of said second member being inclined so that the orifices formed between said members for the first set of slots are larger than those of the next set of slots, and means distinct from said members for forcing the material being treated through said orifices.

3. In an homogenizer, the combination of a housing, orifice forming members mounted in said housing and providing a series of sets of radially disposed circumferentially spaced homogenizing orifices, an outlet for said housing, a conical deflector plate mounted in said outlet and adjustable relative to its discharge opening to film out ingredients passed through said orifices, and means adjacent said deflector for feeding an ingredient to said film of ingredients.

4. In an homogenizer, the combination of a housing, a member mounted in said housing having a central opening and spaced sets of annularly disposed slots, each of said slots tapering to an orifice forming end, a second member having an annular obturating portion disposed in the space between said spaced sets of slots and adjustable lengthwise relative to the orifice forming ends of said slots to form orifices, the slots of the first set of annularly disposed slots being wider than those of the next set of slots, and means distinct from said members for forcing the material being treated through said orifices.

References Cited in the file of this patent

UNITED STATES PATENTS

| | | |
|---|---|---|
| 972,883 | Ludwig | Oct. 18, 1910 |
| 2,132,854 | Knott | Oct. 11, 1938 |
| 2,321,599 | Hoffmann | June 15, 1943 |
| 2,504,678 | Gardner | Apr. 18, 1950 |

FOREIGN PATENTS

| | | |
|---|---|---|
| 304,025 | Switzerland | Dec. 31, 1954 |